(12) United States Patent
Hu et al.

(10) Patent No.: US 11,635,576 B2
(45) Date of Patent: Apr. 25, 2023

(54) FERRULE SUB-ASSEMBLY FOR A FIBER OPTIC CONNECTOR

(71) Applicant: Senko Advanced Components, Inc., Marlborough, MA (US)

(72) Inventors: Guanpeng Hu, Shanghai (CN); Jimmy Jun-Fu Chang, Worcester, MA (US); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/380,612

(22) Filed: Jul. 20, 2021

(65) Prior Publication Data

US 2022/0026643 A1 Jan. 27, 2022

Related U.S. Application Data

(60) Provisional application No. 63/056,508, filed on Jul. 24, 2020, provisional application No. 63/056,503, filed on Jul. 24, 2020.

(51) Int. Cl.
*G02B 6/38* (2006.01)

(52) U.S. Cl.
CPC ......... *G02B 6/3885* (2013.01); *G02B 6/3821* (2013.01); *G02B 6/3825* (2013.01); *G02B 6/3857* (2013.01); *G02B 6/3869* (2013.01); *G02B 6/3882* (2013.01)

(58) Field of Classification Search
CPC .................................................. G02B 6/3885
See application file for complete search history.

(56) References Cited

U.S. PATENT DOCUMENTS

| | | | | |
|---|---|---|---|---|
| 5,212,752 A | * | 5/1993 | Stephenson | G02B 6/3887 385/139 |
| 6,206,581 B1 | * | 3/2001 | Driscoll | G02B 6/3869 385/139 |
| 6,464,408 B1 | * | 10/2002 | Nolan | G02B 6/3869 385/87 |
| 6,918,704 B2 | * | 7/2005 | Marrs | G02B 6/3887 385/53 |
| 2006/0153503 A1 | * | 7/2006 | Suzuki | G02B 6/3807 385/53 |
| 2008/0273837 A1 | * | 11/2008 | Margolin | G02B 6/3849 264/1.25 |
| 2013/0022317 A1 | * | 1/2013 | Norris | G02B 6/3885 29/428 |
| 2017/0343741 A1 | * | 11/2017 | Coenegracht | G02B 6/3816 |

* cited by examiner

*Primary Examiner* — Michael Stahl

(57) ABSTRACT

A fiber optic ferrule sub-assembly for insertion into an outer housing of a fiber optic connector includes a ferrule assembly having a ferrule that forms an optical communication connection with another fiber optic device. A back housing includes a back post to be attached to a fiber optic cable. A spring is operatively disposed between the ferrule assembly and the back housing. A linkage connects the ferrule assembly to the back housing such that the spring is compressed and biases the ferrule away from the back housing prior to insertion of the fiber optic ferrule sub-assembly into the outer housing.

20 Claims, 7 Drawing Sheets

US 11,635,576 B2

1

FERRULE SUB-ASSEMBLY FOR A FIBER OPTIC CONNECTOR

CROSS-REFERENCE TO RELATED APPLICATIONS

This application claims priority to U.S. Provisional App. No. 63/056,508, filed Jul. 24, 2020, and U.S. Provisional App. No. 63/056,503, filed Jul. 24, 2020, the entireties of which are hereby incorporated by reference.

FIELD

The present disclosure generally relates to fiber optic connectors, and, more specifically, to a ferrule sub-assembly for a fiber optic connector.

BACKGROUND

Optical connectors are used within optical communication networks to interconnect optical cables to optical devices or other optical cables. Optical connections typically involve two optical connectors connected together that have ferrules which facilitate the formation of the optical connection formed by the connected optical connectors.

SUMMARY

In one aspect, a fiber optic ferrule sub-assembly for insertion into an outer housing of a fiber optic connector comprises a ferrule assembly including a ferrule configured to form an optical communication connection with another fiber optic device. A back housing includes a back post configured to be attached to a fiber optic cable. A spring is operatively disposed between the ferrule assembly and the back housing. A linkage connects the ferrule assembly to the back housing such that the spring is compressed and biases the ferrule away from the back housing prior to insertion of the fiber optic ferrule sub-assembly into the outer housing.

In another aspect, a fiber optic connector including the fiber optic subassembly as set forth in the preceding paragraph. The fiber optic subassembly is received in and connected to the outer housing.

In another aspect, a method of assembling a fiber optic connector comprises forming a ferrule sub-assembly. Forming the ferrule sub-assembly includes the steps of providing a ferrule assembly including a ferrule and at least one optical fiber received in the ferrule in a configuration for optical communication with another fiber optic device; connecting the ferrule assembly to a back housing so that a spring disposed between the ferrule assembly and the back housing is held in a compressed state; and securing the fiber optic cable to a back post of the back housing after the ferrule assembly is connected to the back housing. The method of assembling further includes inserting the ferrule sub-assembly to an outer housing of the fiber optic connector and attaching the ferrule sub-assembly to the outer housing.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
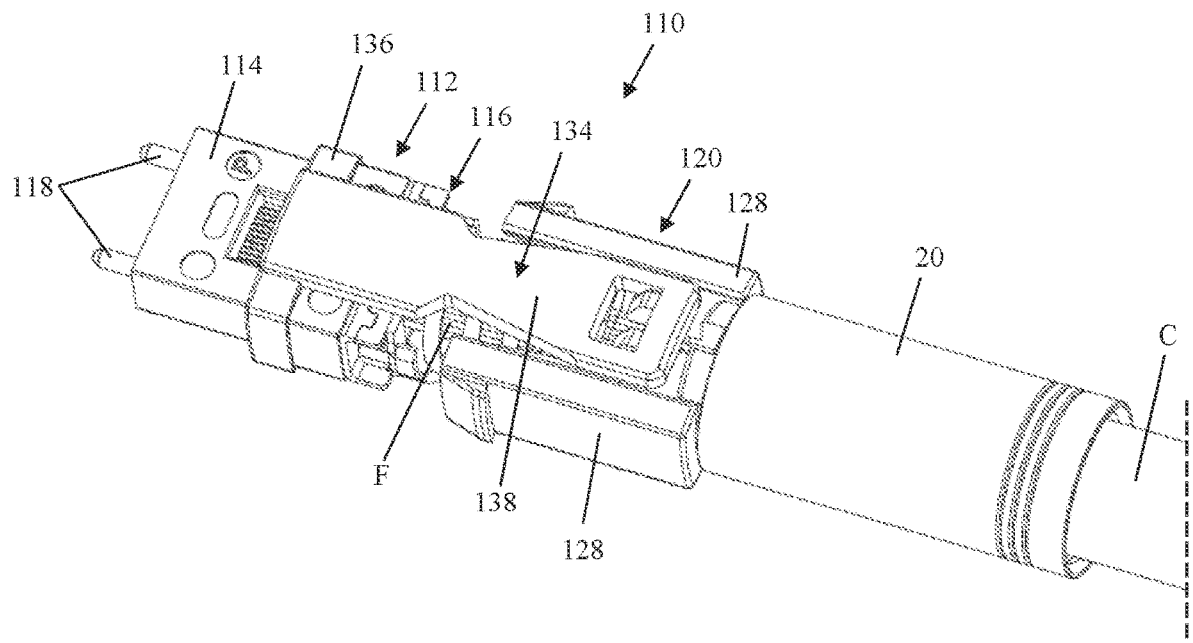
FIG. 1 is a perspective of a fiber optic ferrule sub-assembly according to one embodiment of the present disclosure attached to a fiber optic cable.
Figure 2:
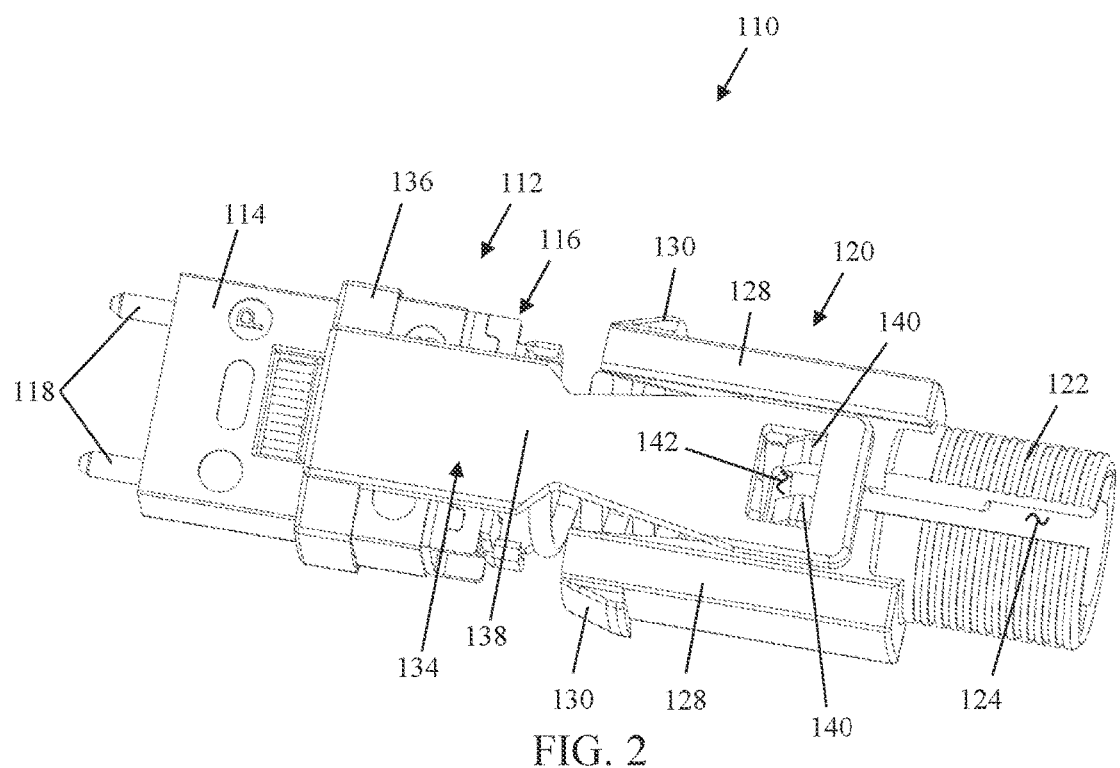
FIG. 2 is a perspective of the fiber optic ferrule sub-assembly.
Figure 3:
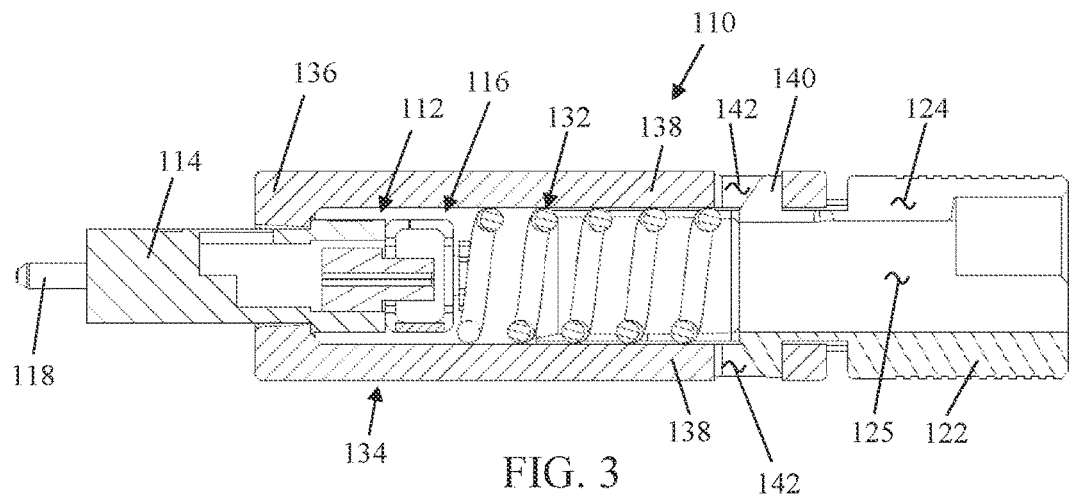
FIG. 3 is a longitudinal section of the fiber optic ferrule sub-assembly.
Figure 4:
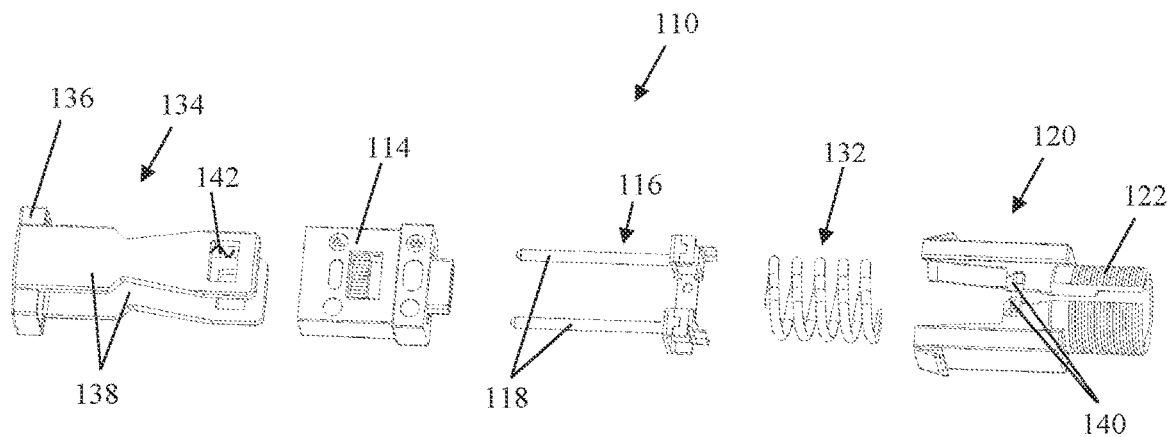
FIG. 4 is an exploded view of the fiber optic ferrule sub-assembly.
Figure 5:
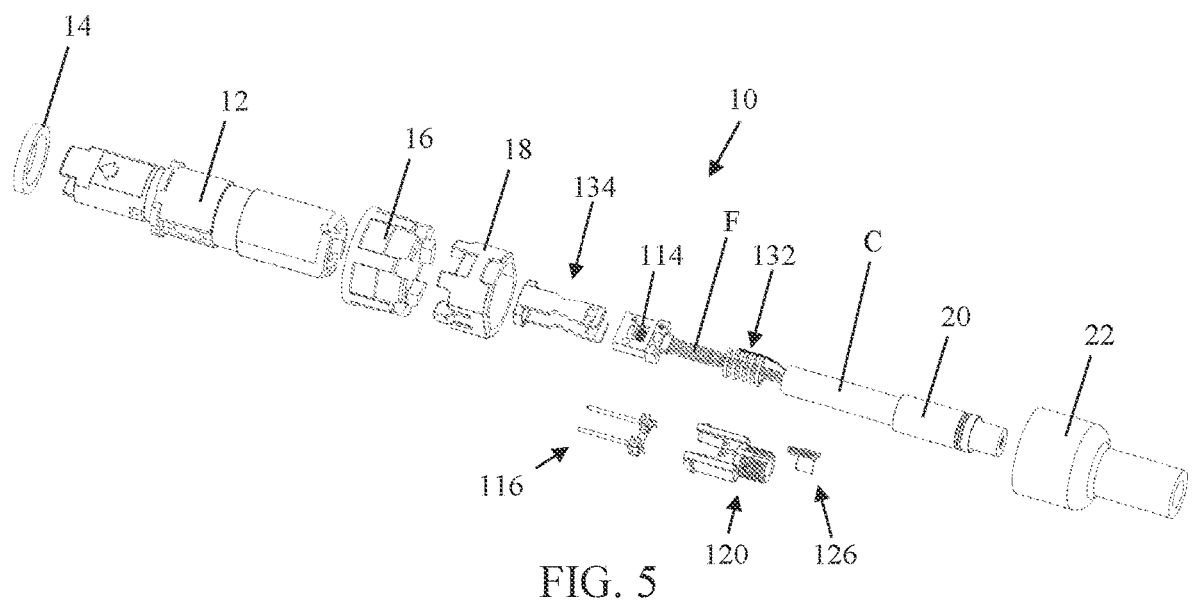
FIG. 5 is an exploded view of a fiber optic connector including the fiber optic ferrule sub-assembly.
Figure 6A:
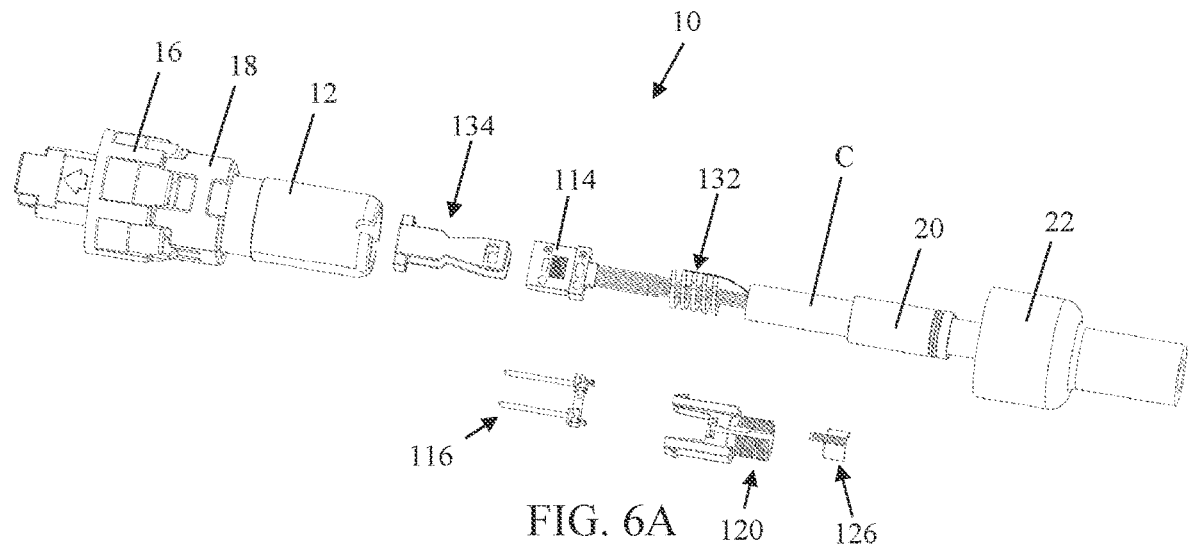
FIGS. 6A-6F illustrated the steps for assembling the fiber optic connector of FIG. 5.
Figure 6B:
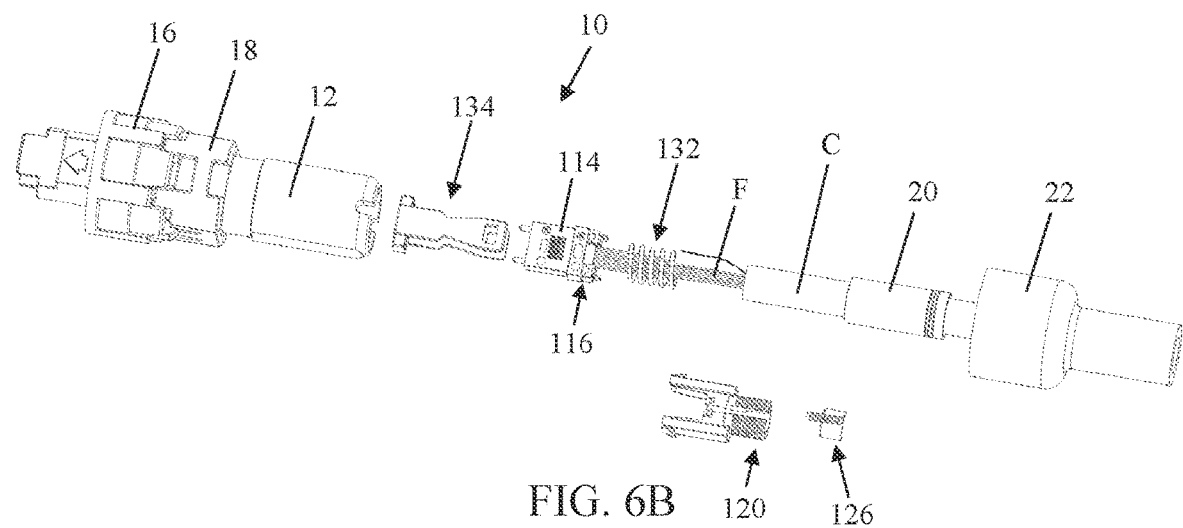
Figure 6C:
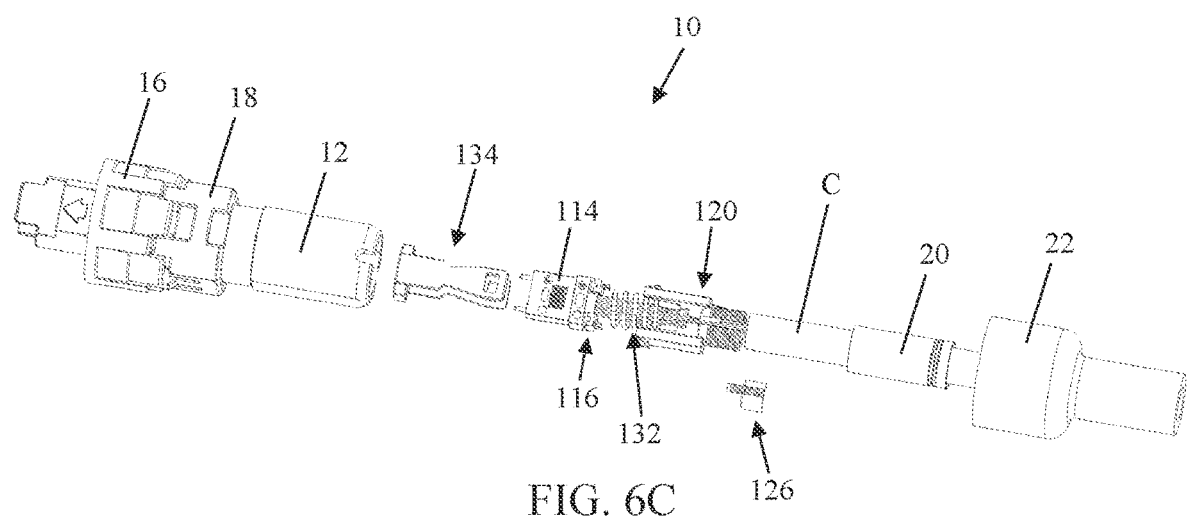
Figure 6D:
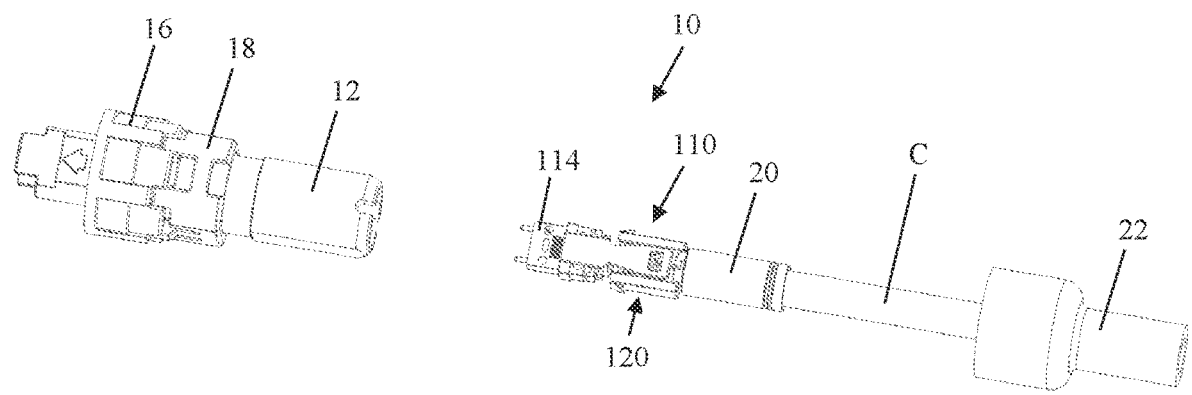
Figure 6E:
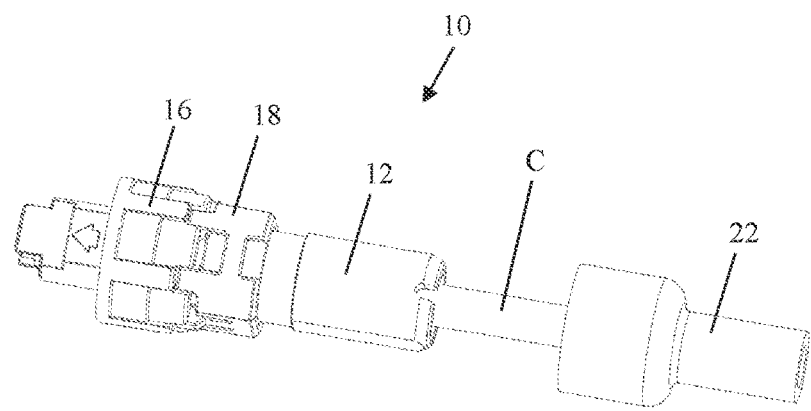
Figure 6F:
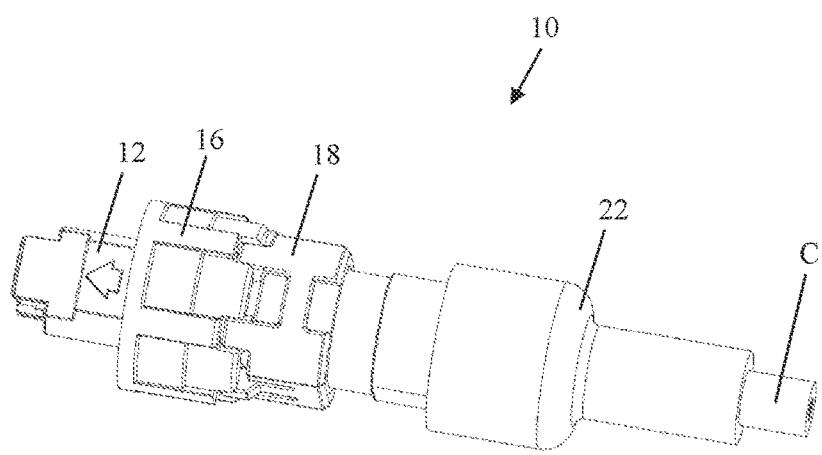
Figure 11:
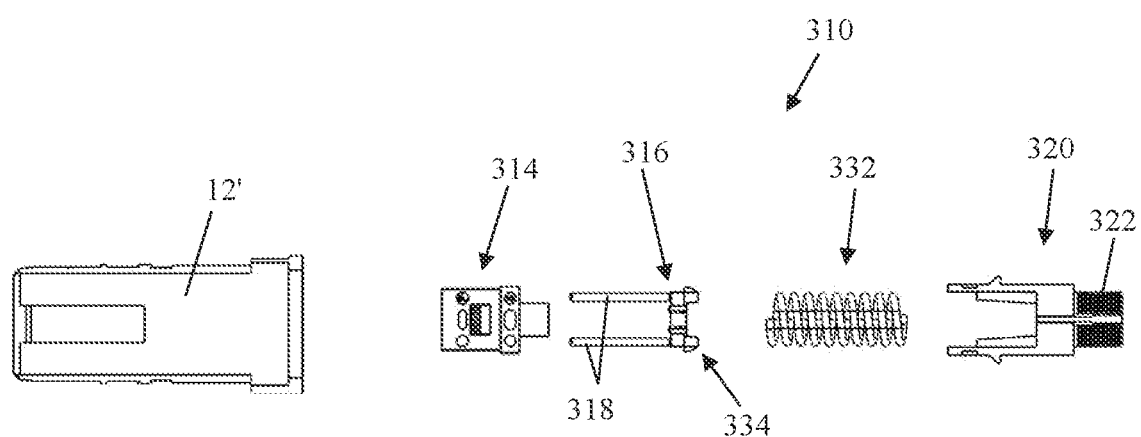
FIG. 11 is an exploded view of the fiber optic sub-assembly of FIG. 8.

Referring to the drawings and in particular FIGS. 5 and 6F, fiber optic ferrule sub-assemblies are shown for use in fiber optic connectors 10. The fiber optic connector 10 is constructed to form a fiber optic connection with a fiber optic device, such as another fiber optic connector or a fiber optic adapter. When coupled to the fiber optic device, the fiber optic connector 10 and fiber optic device form an optical connection that enables communication between different fiber optic components (e.g., cables, devices, etc.) in an optical communications network. The fiber optic connector 10 is attached to an end of a fiber optic cable C, although other arrangements are within the scope of the present disclosure. In the illustrated embodiment, the fiber optic connector 10 includes an outer housing 12 which houses or encases the fiber optic ferrule sub-assembly, a perimeter seal or gasket 14 for forming a seal with fiber optic device, a coupling nut 16 for coupling the fiber optic connector to the fiber optic device, a lock ring 18 to inhibit the coupling nut 16 from inadvertently disconnecting from the fiber optic device, a crimp ring 20 for securing the fiber optic cable C (e.g., the outer jacket thereof) to the fiber optic ferrule sub-assembly, a heat shrink cover 22 that extends over the outer housing and fiber optic cable, and the fiber optic ferrule sub-assembly. The fiber optic ferrule sub-assembly is received in and connected to the outer housing 12 of the connector 10. In the illustrated embodiment of FIGS. 1-6F, the connector 10 is an outdoor rated fiber optic connector. Other configurations of the fiber optic connector 10 are within the scope of the present disclosure. For example, the connector could have other configurations of the outer housing, such as the outer housing 12' (FIG. 11). In another example, the connector may not include one or more of the components such as the coupling nut, gasket and lock ring. In another example, the connector could make electrical or other types of connections instead of or in addition to an optical connection.

Referring to FIGS. 1-6F, one embodiment of a fiber optic ferrule sub-assembly according to the present disclosure is generally indicated at reference numeral 110. The fiber optic ferrule sub-assembly 110 is size and shaped to be inserted into the outer housing 12 of the connector 10. The fiber optic ferrule sub-assembly 110 includes a ferrule assembly 112 having a ferrule 114 (broadly, at least one ferrule). The ferrule 114 is configured to form an optical connection with another fiber optic device. In the illustrated embodiment, the ferrule 114 is a mechanical-transfer (MT) ferrule and, more specifically, is a multi-fiber push-on (MPO) ferrule, although other types of ferrules are within the scope of the present disclosure. The ferrule 114 is directly connected to one or more optical fibers F of the fiber optic cable C. In this embodiment, the ferrule assembly 112 also includes a pin holder or keeper 116 holding one or more alignment pins 118. The ferrule assembly 112 is male ferrule assembly with the pins 118 extending through and out of the ferrule 114 in order to be received by a corresponding female ferrule (broadly, ferrule assembly) of the fiber optic device. In other embodiment, the ferrule assembly 112 may be a female ferrule assembly having a pin keeper with pins that only extend partially into the ferrule or omit the pin keeper all together.

The fiber optic ferrule sub-assembly 110 includes a rear or back housing 120. The back housing 120 is disposed distal of the ferrule assembly 112. The back housing 120 includes a back post 122 at the rear or distal end thereof. The back post 122 is configured to be attached to the fiber optic cable C (specifically, the outer jacket and/or strength fibers of the outer jacket). The crimp ring 20 is crimped or compressed around the outer jacket of the fiber optic cable C and the back post 122 to secure the fiber optic cable to the back housing 120 (broadly, the fiber optic ferrule sub-assembly 110). The back post 122 defines a fiber opening 125 through which the one or more fibers F extend. In the illustrated embodiment, the back post 122 defines a longitudinally extending slot 124 in communication with the fiber opening 125. The fibers F can be moved through the slot 124 (e.g., laterally through the slot) in order to position the fibers in the fiber opening 125 when attaching the fiber optic cable C to the back housing 120, instead of threading the fibers through the fiber opening. This makes is easier to assemble the fiber optic ferrule sub-assembly 110. The fiber optic ferrule sub-assembly 110 may include a back post slide or cover 126 sized and shaped to be inserted into the slot 124 to prevent the fibers F from inadvertently moving back through the slot and out of the fiber opening 125 once disposed in the fiber opening. The back housing 120 also includes first and second arms 128 extending forward or proximally from the back post 122. The arms 128 extend from opposite sides of the back post 122. The back housing 120 includes a connection structure disposed for connection to the outer housing 12 of the connector 10. In the illustrated embodiment, the connection structure of the back housing 120 comprises one or more outer housing detents 130 configured to engage (e.g., form a snap-fit connection with) the outer housing 12 of the connector 10 when the fiber optic ferrule sub-assembly 110 is coupled to the outer housing to secure the fiber optic ferrule sub-assembly to the outer housing. In the illustrated embodiment, the back housing 120 includes two outer housing detents 130, one on each arm 128.

The fiber optic ferrule sub-assembly 110 includes a spring 132 (e.g., a coil spring). The spring 132 is operatively disposed between the ferrule assembly 112 and the back housing 120. In the illustrated embodiment, the spring extends between the ferrule assembly 112 and the back housing 120, with one end of the spring engaging the pin keeper 116 and the other end engaging of the back housing 120 between the arms 128. The spring 132 biases the ferrule assembly 112 proximally or away from the back housing 120. The one or more fibers F extend through the spring 132. The arms 128 of the back housing 120 are spaced apart and define opposite sides (e.g., left and right sides) of a space sized and shaped to receive the spring 132 when the spring is compressed between the ferrule assembly 112 and the back housing.

The fiber optic ferrule sub-assembly 110 includes a linkage 134. The linkage 134 connects the ferrule assembly 112 to the back housing 120. Specifically, the linkage 134 is connected to the ferrule assembly 112 and to the back housing 120. In this embodiment, the linkage 134 comprises a ferrule holder 136 and two retaining arms 138 (broadly, at least one retaining arm). The ferrule holder 136 captures the ferrule 114 of the ferrule assembly 112. The ferrule holder 136 has the shape of a rectangular annulus and defines a ferrule opening. The ferrule 114 is disposed in (and extends through) the ferrule opening of the ferrule holder 136. The ferrule 114 can move relative to the ferrule holder 136 within the ferrule opening. An enlarged base portion of the ferrule 114 is engagable with the ferrule holder 136 to prevent the ferrule from moving distally out of the ferrule holder. Thus, from the position shown in FIG. 1, the ferrule 114 cannot move distally with respect to the ferrule holder 135, but the ferrule and pin keeper 116 can move proximally with respect to the ferrule holder. It will be understood that the spring 132 biases the ferrule 114 and pin keeper 116 distally. Each retaining arm 138 extends from the ferrule holder 136. In the illustrated embodiment, the two (e.g., first and second) retaining arms 138 extend from opposite sides (e.g., an upper side and a lower side) of the ferrule holder 136. The two retaining arms 138 are generally identical, but could have different configurations. Moreover, the number of retaining arms could be fewer or greater than two. The retaining arms 138 of the linkage 134 are connected to the back housing 120.

The back housing 120 includes a connection structure connected to the linkage 134. In the illustrated embodiment, the connection structure of the back housing 120 comprises a pair (broadly, one or more) detents 140. Each detent is configured to engage the linkage 134 to couple the linkage to the back housing 120. The linkage 134 includes an opening 142 (broadly, at least one opening) that receive the detents 140 to connect the linkage to the back housing 120. It will be understood that the opening 142 may be considered a "recess" in the present description. In other embodiments, the linkage 134 may include the one or more detents and the back housing 130 may include the one or more recesses that receives the one or more detents (broadly, one of the back housing 120 and the linkage 134 includes a detent and the other of the back housing and the linkage includes a recess receiving the detent to connect the linkage to the back housing). Referring back to the illustrated embodiment, each arm 138 of the linkage 134 defines the opening 142 adjacent the distal end thereof that receives two detents 140 of the back housing 120. Thus, in this embodiment, the back housing 120 includes four detents 140, two on each side thereof. One retaining arm 138 engages the two detents 140 on one side of the back housing 120 and the other retaining arm engages the two detents on the other side of the back housing.

The linkage 134 is connected to the back housing 120 via a snap-fit connection. The two arms 138 of the linkage 134 are resiliently deflectable. To connect the linkage 134 to the back housing 120, the linkage 134 is moved distally or rearward relative to the back housing. As the linkage 134 moves distally, the arms 138 engage and are deflected by the detents 140. As the linkage 134 continues to move distally, the recesses 142 on each arm 138 become aligned with the detents 140, permitting the arms to return or snap-back to their original, undeflected position.

The linkage 134 connects the ferrule assembly 112 to the back housing 120 such that the spring 132 is compressed and biases the ferrule 114 away from (e.g., proximally or in a forward direction) the back housing prior to insertion of the fiber optic ferrule sub-assembly 110 into the outer housing 12. In this way, the spring 132 is generally pre-compressed prior to insertion into the outer housing 12 of the connector 10. In particular, the spring 132 is compressed before the fiber optic cable C is secured to the fiber optic ferrule sub-assembly 110 (e.g., the back post 122) by the crimp ring 20. In conventional fiber optic connectors, the spring would not be compressed until the fiber optic ferrule sub-assembly was inserted into the outer housing. Because the fiber optic cable C has to be attached to fiber optic ferrule sub-assembly before being inserted into the outer housing, compressing the spring as the fiber optic ferrule sub-assembly is inserted into the outer housing (and after the fiber optic cable is attached to the fiber optic ferrule sub-assembly) can bunch and otherwise bend the fibers F. The fibers F bunch and bend as the ferrule is moved distally (by the outer housing as the fiber optic ferrule sub-assembly is inserted into the outer housing) relative to a back post connected to the fiber optic cable C to compress the spring. This bunching and bending can damage the fibers F and/or cause transmission losses. The fiber optic ferrule sub-assembly 110 of the present disclosure allows the spring 132 to be compressed before the fiber optic ferrule sub-assembly is inserted into the outer housing 12 of the connector 10 and before the fiber optic cable C is attached to the fiber optic ferrule sub-assembly. As a result, no bunching or bending of the fibers F occurs due to the compression of the spring 132 as the fiber optic connector 10 is assembled.

Referring to FIGS. 6A-6F, the steps for assembling the fiber optic connector 10 with the fiber optic ferrule sub-assembly 110 are generally illustrated. To start the assembly of the connector 10, the fiber optic ferrule sub-assembly 110 is formed. First, as shown in FIG. 6A, the optical fibers F of the fiber optic cable C are received in (e.g., connected to) the ferrule 114 of the ferrule assembly 112. The end surfaces of the fibers terminated in the ferrule 114 are polished. Some components such as the spring 132, the crimp ring 20, and the heat shrink cover 22 may be threaded onto the fiber optic cable C for use in later steps before attaching the ferrule 114 to the one or more fibers F or one or more of these components can be positioned on the cable at a later time, such as by threading these components from the other end of the cable or over the ferrule 114. Next, as shown in FIG. 6B, the pin keeper 116 is attached to the ferrule 114. The one or more pins 118 are inserted proximally into corresponding pin passageways in the ferrule 114. Then, the back housing 120 is positioned on the cable C (specifically, the fibers F) by moving the fibers through the slot 124 and into the fiber opening 125 defined by the back post 122. When positioning the back housing 120, the spring is also positioned along the fibers F between the ferrule 114 and the back housing, as shown in FIG. 6C. After the fibers F are disposed in the fiber opening 125 defined by the back post 122, the back post cover 126 can be inserted into the slot 124, securing the fibers in the fiber opening.

Next, as shown in FIG. 6D, the ferrule assembly 112 is connected to the back housing 120 so that the spring 132 is held in a compressed state. Specifically, the linkage 134 is connected to the ferrule assembly 112 and the back housing 120 to compress the spring 132. The ferrule 114 is inserted proximally into the ferrule opening of the ferrule holder 136 of the linkage 134 to attach the linkage to the ferrule assembly 112. Then, the linkage 134 and ferrule assembly 112 are moved distally until the linkage connects to the back housing 120, as described above. Afterwards, the fiber optic cable C is secured to the back post 122 of the back housing 120. The cable jacket of the fiber optic cable C is positioned over the back post 122 of the back housing 120 and then crimp ring 20 is crimped over the cable jacket and back post, securing these components together.

Now that the fiber optic ferrule sub-assembly 110 is formed, the fiber optic ferrule sub-assembly is inserted into the outer housing 12 of the connector, as shown in FIG. 6E. Preferably, the spring 132 is not further compressed (or compressed no more than a negligible amount) when the fiber optic ferrule sub-assembly 110 is inserted into the outer housing 12 or when the fiber optic ferrule sub-assembly is attached to the outer housing. Once the fiber optic ferrule sub-assembly 110 positioned in the outer housing 12, the outer housing detents 130 (via a snap-fit connection similar to the snap-fit connection described above) engage the outer housing to attach the fiber optic ferrule sub-assembly to the outer housing. Other elements, such as the seal 14, the coupling nut 16, and the lock ring 18 may be positioned on the outer housing 12 before attaching the fiber optic ferrule sub-assembly 110 to the outer housing. After the fiber optic ferrule sub-assembly 110 is attached to the outer housing 12, the heat shrink cover 22 can be attached over the outer housing and the portion of the cable C extending distally from the outer housing. The heat shrink cover 22 is moved into position, as shown by FIG. 6F, and then heat is applied, to shrink the heat shrink cover onto the outer housing 12 and cable C. The connector 10 is now assembled and attached to the fiber optic cable C.

Figure 7:
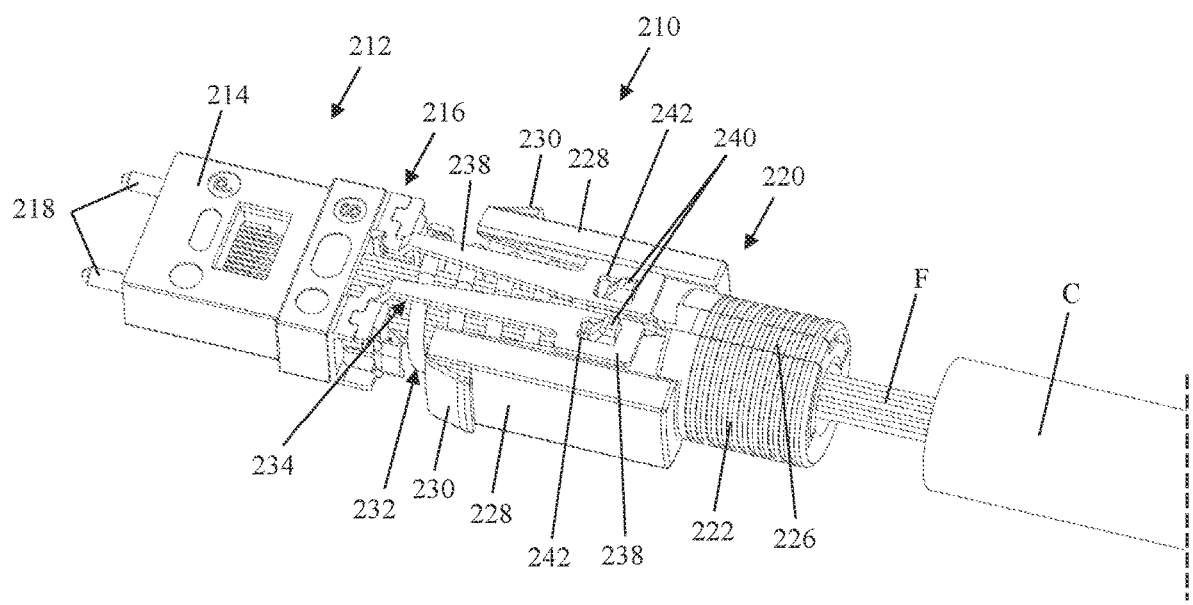
FIG. 7 is another embodiment of a fiber optic ferrule sub-assembly according to another embodiment of the present disclosure.
Figure 8:
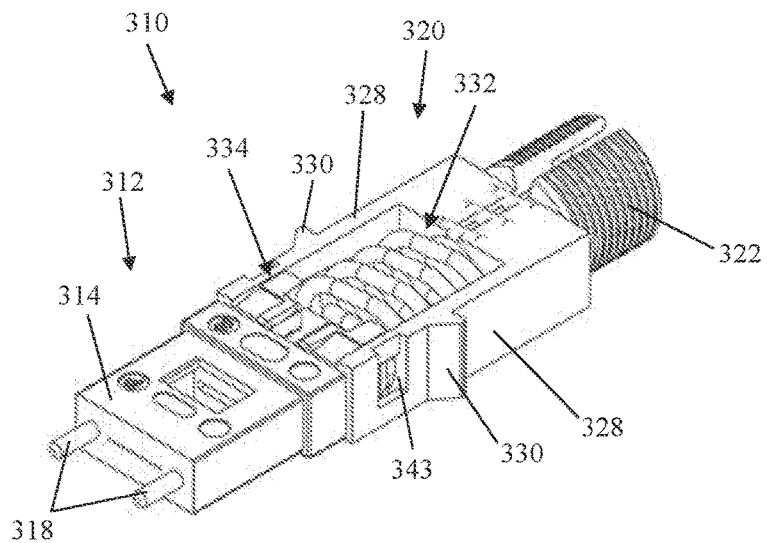
FIG. 8 is yet another embodiment of a fiber optic ferrule sub-assembly according to yet another embodiment of the present disclosure.
Figure 9:
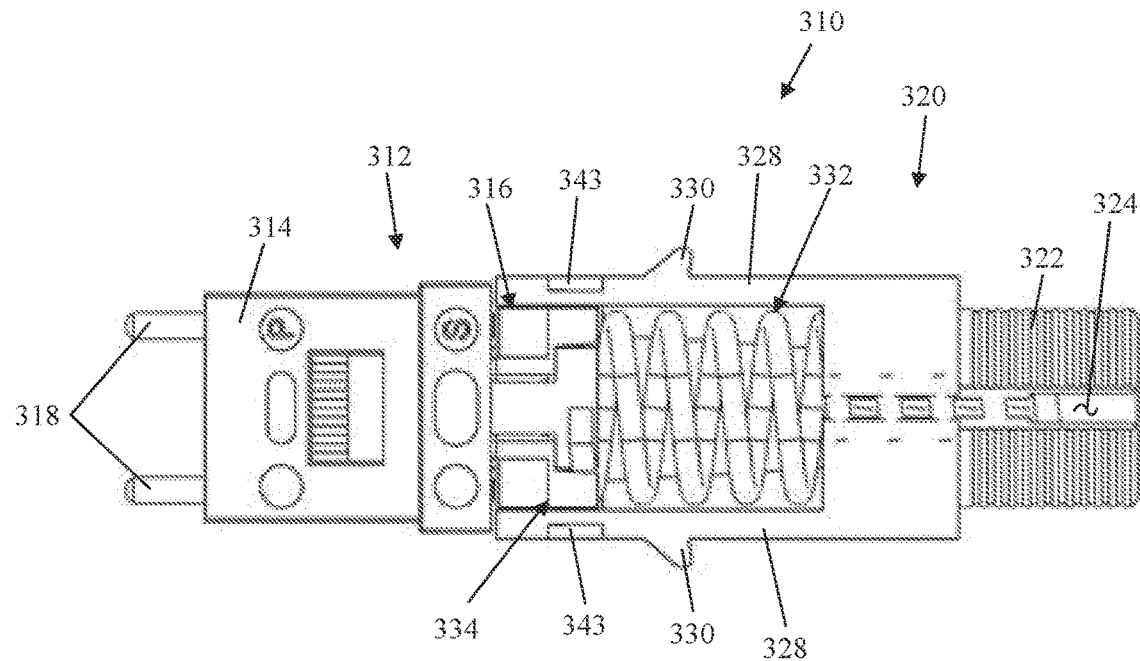
FIG. 9 is a top view of the fiber optic sub-assembly of FIG. 8.
Figure 10:
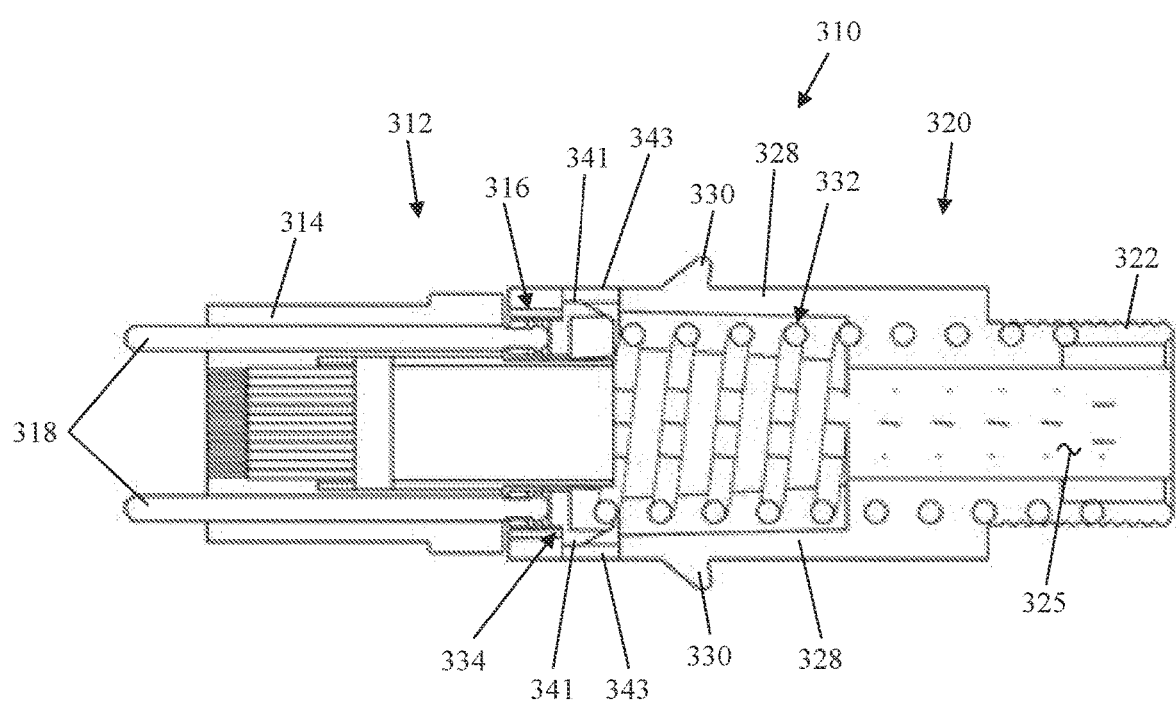
FIG. 10 is longitudinal section of the fiber optic sub-assembly of FIG. 8.

Referring to FIG. 7, another embodiment of a fiber optic ferrule sub-assembly according to the present disclosure is generally indicated by reference numeral 210. The fiber optic ferrule sub-assembly 210 of FIG. 7 is generally analogous to the fiber optic ferrule sub-assembly 110 of FIGS. 1-6F and, thus, for ease of comprehension, where similar, analogous or identical parts are used, reference numerals "100" units higher are employed. Accordingly, unless clearly stated or indicated otherwise, the above descriptions regarding the fiber optic ferrule sub-assembly 110 of FIGS. 1-6F also apply to the fiber optic ferrule sub-assembly 210 of FIG. 7. For example, the fiber optic ferrule sub-assembly 210 of FIG. 7 can be the fiber optic ferrule sub-assembly of the fiber optic connector 10 illustrated in FIGS. 5-6F.

In this embodiment, the linkage 234 is integral with the ferrule assembly 212. As used herein, "integral" refers to something which may be formed as one piece with the other article, or formed separately from the other article and attached to the article. The linkage 234 includes at least one retaining arm 238 integral with the pin keeper 216. The at least one retaining arm 238 extends from the pin keeper 216 and is connected to the back housing 220. In the illustrated embodiment, the linkage 234 includes four retaining arms 238, which are generally identical to each other (e.g., mirror images of each other). Two retaining arms 238 extend from an upper side of the pin keeper 216 and the other two retaining arms (hidden from view) extend from a lower side of the pin keeper. Each retaining arm 238 defines an opening (or "recess") 242 that receives one of the detents 240 of the back housing 220 to couple the linkage (and therefore the ferrule assembly 212) to the back housing. Otherwise, the construction and operation of the fiber optic ferrule sub-assembly 210 of FIG. 7 is generally the same as the fiber optic ferrule sub-assembly 110 of FIGS. 1-6F. For example, a fiber optic connector having the fiber optic ferrule sub-assembly 210 of FIG. 7 is assembled in generally the same way as the fiber optic connector 10 having the fiber optic ferrule sub-assembly 110 of FIGS. 1-6F, except when forming the fiber optic ferrule sub-assembly 210 of FIG. 7, the step of attaching the linkage to the ferrule assembly is absent.

Referring to FIGS. 8-11, another embodiment of a fiber optic ferrule sub-assembly according to the present disclosure is generally indicated by reference numeral 310. The fiber optic ferrule sub-assembly 310 of FIGS. 8-11 is generally analogous to the fiber optic ferrule sub-assembly 110 of FIGS. 1-6F and, thus, for ease of comprehension, where similar, analogous or identical parts are used, reference numerals "200" units higher are employed. Accordingly, unless clearly stated or indicated otherwise, the above descriptions regarding the fiber optic ferrule sub-assembly 110 of FIGS. 1-6F also apply to the fiber optic ferrule sub-assembly 310 of FIGS. 8-11. For example, the fiber optic ferrule sub-assembly 310 of FIGS. 8-11 can be the fiber optic ferrule sub-assembly of the fiber optic connector 10 illustrated in FIGS. 5-6F.

In this embodiment, the linkage 334 is integral with the ferrule assembly 312. The linkage 334 includes two detents 341 (broadly, at least one detent) integral with the pin keeper 316. Each detent 341 is configured to engage the back housing 320 to couple the linkage 334 and ferrule assembly 312 to the back housing. The back housing 320 includes two openings or recesses 343 (broadly, connection structure) that each receive a corresponding one of the detents 341 to connect the linkage to the back housing. It will be understood that the back housing 320 may include only one recess or more than two recesses. In the illustrated embodiment, the two (e.g., first and second) detents 341 are located on each side (e.g., left and right side) of the pin keeper 316 and the two (e.g., first and second) recesses 343 are on respective sides (e.g., left and right side) of the back housing 320. Each recess 343 receives one of the detents 341. Each arm 328 of the back housing 320 defines one of the recesses 343 adjacent the free or proximal end thereof. In one embodiment, the recesses 343 are slightly oversized to permit a very small amount of movement (e.g., distal movement), such as 1.5 mm or less, to allow the ferrule 314 (and by extension the linkage 334) to move distally when the ferrule engages the fiber optic device and forms the optical connection. As explained above, this small amount of movement ensures the ferrule 314 forms a solid optical connection with the fiber optic device.

The linkage 334 is connected to the back housing 320 via a snap-fit connection. The two arms 328 of the back housing 320 are resiliently deflectable. To connect the linkage 334 to the back housing 320, the linkage 334 (i.e., the ferrule 314 and pin keeper 316) is moved distally or rearward relative to the back housing 320. As the linkage 334 moves distally, the arms 328 are engaged and deflected by the detents 341 of the linkage. As the linkage 334 continues to move distally, the recesses 343 on each arm 328 become aligned with the detents 341, permitting the arms to return or snap-back to their original, undeflected position. Otherwise, the construction and operation of the fiber optic ferrule sub-assembly 310 of FIGS. 8-11 is generally the same as the fiber optic ferrule sub-assembly 110 of FIGS. 1-6F. For example, a fiber optic connector having the fiber optic ferrule sub-assembly 310 of FIGS. 8-11 is assembled in generally the same way as the fiber optic connector 10 having the fiber optic ferrule sub-assembly 110 of FIGS. 1-6F, except when forming the fiber optic ferrule sub-assembly 310 of FIGS. 8-11, the step of attaching the linkage to the ferrule assembly is absent. As mentioned herein, the fiber optic ferrule sub-assembly 310 of FIGS. 8-11 can be inserted into the outer housing 12 of FIGS. 5-6F or other configurations of an outer housing such as the outer housing 12' illustrated in FIG. 11.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fiber optic ferrule sub-assembly for insertion into an outer housing of a fiber optic connector comprising:
   a ferrule assembly including a ferrule configured to form an optical communication connection with another fiber optic device;
   a back housing including a back post configured to be attached to a fiber optic cable;
   a spring operatively disposed between the ferrule assembly and the back housing; and
   a linkage connecting the ferrule assembly to the back housing such that the spring is compressed and biases the ferrule away from the back housing prior to insertion of the fiber optic ferrule sub-assembly into the outer housing,
   wherein the back housing includes a first connection structure connected to the linkage and a second connection structure disposed for connection to the outer housing of the fiber optic connector.

2. The ferrule sub-assembly of claim 1, wherein the linkage is connected to the back housing via a snap-fit connection.

3. The ferrule sub-assembly of claim 2, wherein one of the back housing and the linkage includes a detent and the other of the back housing and the linkage includes a recess receiving the detent to connect the linkage to the back housing.

4. The ferrule sub-assembly of claim 3, wherein the back housing includes the detent and the linkage includes the recess receiving the detent to connect the linkage to the back housing.

5. The ferrule sub-assembly claim 1, wherein the linkage comprises a ferrule holder supporting the ferrule and at least one retaining arm extending from the ferrule holder and connected to the back housing.

6. The ferrule sub-assembly of claim 5, wherein the linkage includes two retaining arms extending from opposite sides of the ferrule holder.

7. The ferrule sub-assembly of claim 5, wherein the ferrule holder defines a ferrule opening, the ferrule being disposed in the ferrule opening.

8. The ferrule sub-assembly of claim 1, wherein the linkage includes a first and second retaining arms connected to opposite sides of the back housing.

9. The ferrule sub-assembly of claim 1, wherein the ferrule assembly further comprises at least one pin and a pin keeper holding the pin, and wherein the linkage includes at least one retaining arm extending from the pin keeper and connected to the back housing.

10. The ferrule sub-assembly of claim 1, wherein the ferrule assembly further comprises at least one pin and a pin keeper holding the pin, and wherein the linkage includes a detent on the pin keeper and the back housing includes a recess receiving the detent to connect the linkage to the back housing.

11. The ferrule sub-assembly of claim 10, wherein the detent is a first detent and the recess is a first recess, the linkage including a second detent fixed to the pin keeper and the back housing including a second recess receiving the second detent to connect the linkage to the back housing.

12. The ferrule sub-assembly of claim 11, wherein the back housing includes first and second arms, the first arm defining the first recess adjacent a free end thereof and the second arm defining the second recess adjacent a free end thereof.

13. The ferrule sub-assembly of claim 1, wherein the ferrule is a multi-fiber push-on (MPO) ferrule.

14. The ferrule sub-assembly of claim 1, wherein the back housing includes one or more outer housing detents configured to engage an outer housing of the fiber optic connector when the ferrule sub-assembly is coupled to the outer housing to secure the ferrule sub-assembly to the outer housing.

15. A fiber optic connector comprising the ferrule sub-assembly as set forth in claim 1 received in and connected to the outer housing of the fiber optic connector.

16. A fiber optic ferrule sub-assembly for insertion into an outer housing of a fiber optic connector comprising:
   a ferrule assembly including a ferrule configured to form an optical communication connection with another fiber optic device;
   a back housing including a back post configured to be attached to a fiber optic cable;
   a spring operatively disposed between the ferrule assembly and the back housing; and
   a linkage connecting the ferrule assembly to the back housing such that the spring is compressed and biases the ferrule away from the back housing prior to insertion of the fiber optic ferrule sub-assembly into the outer housing,
   wherein the ferrule assembly further comprises at least one pin and a pin keeper holding the pin, and wherein the linkage includes at least one retaining arm extending from the pin keeper and connected to the back housing.

17. A fiber optic ferrule sub-assembly for insertion into an outer housing of a fiber optic connector comprising:
   a ferrule assembly including a ferrule configured to form an optical communication connection with another fiber optic device;
   a back housing including a back post configured to be attached to a fiber optic cable;
   a spring operatively disposed between the ferrule assembly and the back housing; and
   a linkage connecting the ferrule assembly to the back housing such that the spring is compressed and biases the ferrule away from the back housing prior to insertion of the fiber optic ferrule sub-assembly into the outer housing,
   wherein the ferrule assembly further comprises at least one pin and a pin keeper holding the pin, and wherein the linkage includes a detent on the pin keeper and the back housing includes a recess receiving the detent to connect the linkage to the back housing.

18. The ferrule sub-assembly of claim 17, wherein the detent is a first detent and the recess is a first recess, the linkage including a second detent fixed to the pin keeper and the back housing including a second recess receiving the second detent to connect the linkage to the back housing.

19. The ferrule sub-assembly of claim 18, wherein the back housing includes first and second arms, the first arm defining the first recess adjacent a free end thereof and the second arm defining the second recess adjacent a free end thereof.

20. A fiber optic ferrule sub-assembly for insertion into an outer housing of a fiber optic connector comprising:
   a ferrule assembly including a ferrule configured to form an optical communication connection with another fiber optic device;
   a back housing including a back post configured to be attached to a fiber optic cable;
   a spring operatively disposed between the ferrule assembly and the back housing; and
   a linkage connecting the ferrule assembly to the back housing such that the spring is compressed and biases the ferrule away from the back housing prior to insertion of the fiber optic ferrule sub-assembly into the outer housing,
   wherein the back housing includes one or more outer housing detents configured to engage an outer housing of the fiber optic connector when the ferrule sub-assembly is coupled to the outer housing to secure the ferrule sub-assembly to the outer housing.

* * * * *